Nov. 29, 1938.  C. O. MAGENHEIMER  2,138,551
ROOF GAUGE
Filed Feb. 9, 1938
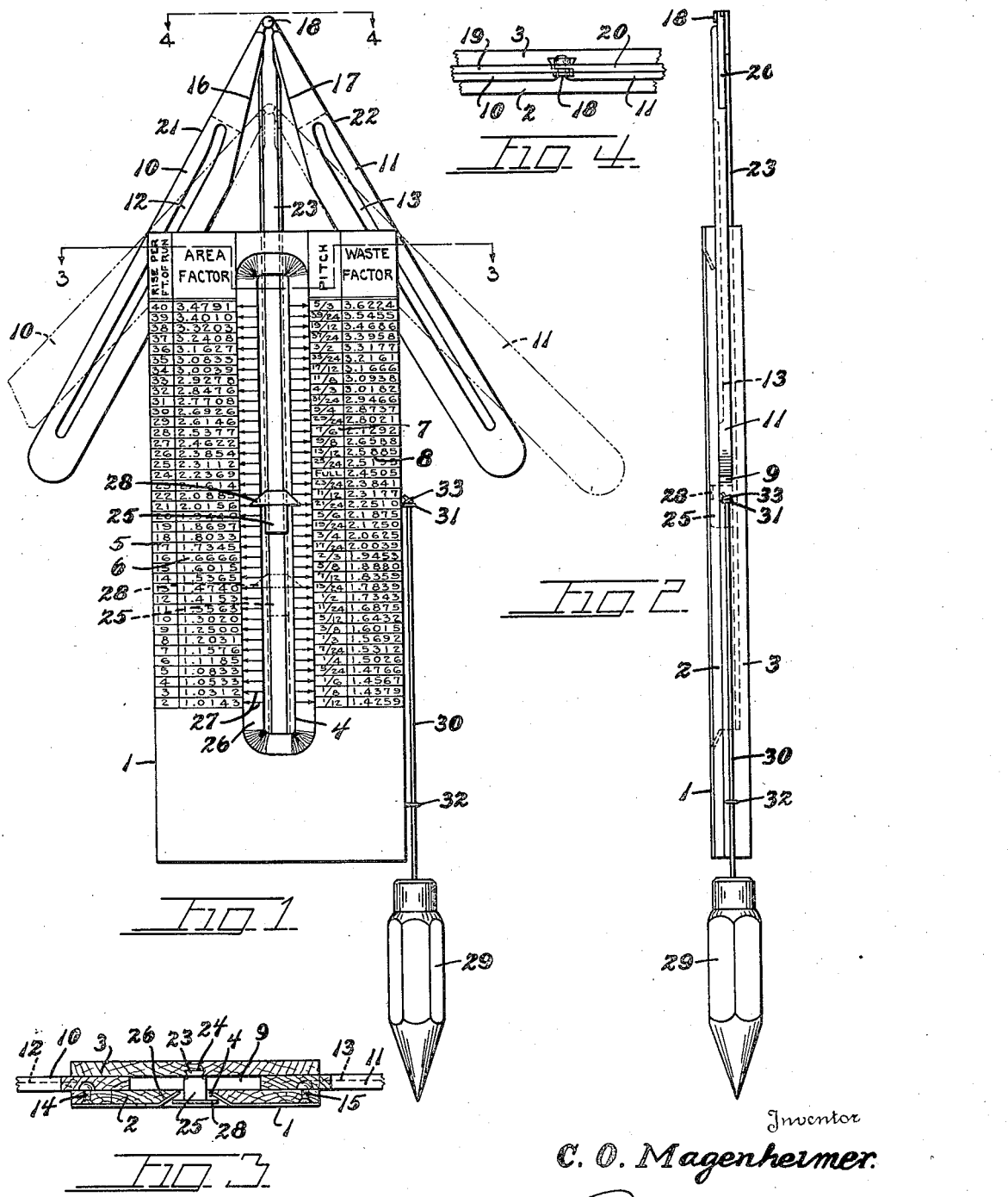

Patented Nov. 29, 1938

2,138,551

UNITED STATES PATENT OFFICE 2,138,551

ROOF GAUGE

Clifford O. Magenheimer, Rochester, N. Y.

Application February 9, 1938, Serial No. 189,646

4 Claims. (Cl. 33—64)

This invention appertains to roof gauges, and more especially, to an instrument of such type as to be primarily adapted for use as an indicator of unknown factors which are functions of known or ascertainable factors involved in the computations of roof coverings, and for other incidental purposes.

Heretofore, the determination of the quantity of shingles or other material required to cover a given roof has necessitated actual measurement of the roof area under consideration. The inconvenience and impracticability attendant upon this practice has more often resulted in the resort to guesswork, which in most cases is very inaccurate, especially where hip or gable roofs, or combinations thereof, are involved.

The primary object of the present invention is to provide a simple instrument which may be conveniently employed to facilitate the accurate determination of the quantity of covering required for a given roof, and without resort to actual measurement of the roof area.

A still further object of the invention is to provide an instrument of the aforementioned character which is of such construction as to be capable of being adjusted to conform to various pitches or slopes of roofs of either the hip type, gable type, or combinations of hip and gable types, and gambrel or mansard roofs, by sighting the instrument against the roof from a convenient spot at or near ground level, and when so adjusted, to visibly indicate the factors necessary to accurately compute the corresponding roof surface.

Another object of the invention is to provide a sighting gauge by which mathematical computations necessary to the determination of roof coverings are reduced to a minimum and to the simplest form.

More specifically, my invention contemplates the provision of a frame or body having one or more tables of factors depicted thereon, which factors are a function of roof area, the frame carrying a pair of blades or arms pivotally connected therewith and with each other, and adjustable to different positions as by sighting the same to the slope of a roof, and provided with index means adapted to cooperate with the table or tables aforesaid for indicating the factors corresponding to the adjustments of the arms or blades.

Other and further objects and advantages of the invention will be hereinafter referred to, and the novel features thereof defined in the appended claims.

In the drawing:—

Figure 1 is a view in front elevation of a gauge constructed in accordance with my invention;

Figure 2 is a view of the gauge in side elevation;

Figure 3 is a horizontal sectional view taken substantially on the line 3—3 of Figure 1; and Figure 4 is a fragmentary sectional view taken on the line 4—4 of Figure 1, and primarily illustrating the pivotal interconnection of the adjustable blades or arms in top plan.

Like reference characters designate corresponding parts in the several figures of the drawing, wherein I generally designates the frame or body of the instrument, which may be constructed of any suitable relatively rigid material such as wood, fiber, metal, or the like. The size and shape of the frame may be varied as desired, but it is preferably of such small and compact size as to be capable of being conveniently carried in a coat pocket or small case. As illustrated, the frame is principally composed of a front section 2 and a rear section 3, each being generally rectangular in shape, and the two sections being suitably secured together in back-to-back relation. The front section 2 is provided with a longitudinal slot 4 disposed substantially centrally thereof, and at opposite sides of the slot 4 are depicted a plurality of tables of factors, respectively designated 5, 6, 7 and 8, with appropriate designations disposed above the same. For instance, the factors of table 5 represent rise per foot of run, while those of table 6 represent constants, which, when multiplied by the horizontal area covered by the roof, will give the actual surface area corresponding to the slope of the roof. The factors of table 7 are given in terms of roof pitch, and those of table 8 are constants, which, when multiplied by the run of the roof, will give the hip and valley lengths for waste areas corresponding to the slope of the roof. In other words, the factors of the different tables are related to each other in the order of their horizontal alignment, and each factor is a function of a particular roof area as will hereinafter become more fully apparent as the description proceeds. Instead of depicting the tables directly upon the front surface of the frame section 2, they may be inscribed, printed or otherwise marked upon a separate sheet or plate of material suitable for the purposes, which can then be applied to the front face of the frame section 2 and secured thereto.

At the upper end of one of the sections of the frame I, such as the rear section 3, the material is cut away to provide a space between the sections, as designated at 9. Received between the upper ends of the frame sections 2 and 3, are a pair of blades or arms 10 and 11, each of which is provided with a groove in one face thereof and extending longitudinally therealong, the groove in the blade 10 being designated 12, and that in the blade 11 being designated 13. Carried by the frame section 2, and projecting from the opposite upper corners thereof into the space 9 are a pair of pins 14 and 15, the free extremities of which are preferably provided with rounded heads which are received in the respective grooves 12 and 13 of the blades or arms 10 and 11, as will be best understood from reference to Figure 3. Thus each of the blades 10 and 11 is pivotally and slidably inter-connected with the frame or body 1. The upper extremities of the blades or arms 10 and 11 are suitably mitered or beveled, as at 16 and 17, respectively, and are hingedly interconnected as by means of the small hinge pin 18. To reduce wear at the hinge, and to reinforce the upper extremities of the blades 10 and 11, the blades are preferably recessed and fitted with metal hinge leaves, designated 19 and 20, the leaves being shaped to correspond with the beveled ends of the blades and extended into overlapping relation for receiving the hinge pin 18 therethrough, as will be best understood from reference to Figure 4. This construction may be modified as desired, but whatever the construction may be, I prefer to have the hinge pin 18 disposed as close as possible to the point of intersection of two lines coextensive with the upper edges 21 and 22, respectively, of the blades 10 and 11. In other words, the edges 21 and 22 of the blades 10 and 11 preferably come together substantially to a sharp point at the ends of the blades which are hingedly interconnected together.

Pivotally connected with and extending downwardly from the hinge pin 18, there is provided a slide bar 23, which is adapted for sliding movement longitudinally of the frame 1. As illustrated, the rear frame section 3 is provided with a groove 24 directly opposite the slot 4 in the front frame section 2 and adapted to receive the slide bar 23 therein so as to guide the bar in its longitudinal movements. The bar 23 and the groove 24 may be of generally dove-tail shape in transverse cross-section, and the bar 23 preferably has a snug fit in the groove 24 so that there will be no lateral play between the bar 23 and the frame 1. Longitudinal movement of the bar 23 relative to the frame 1 may be attained by providing a knob or fingerpiece 25 on the bar, preferably adjacent to its lower end, which extends forwardly through the slot 4 in the front frame section 2 to a position enabling the same to be manipulated upwardly and downwardly in the slot 4. The front frame section 2 is preferably beveled inwardly around the margins of the slot 4, as indicatd at 26, and for convenience of reading the instrument, the graduations 27, as shown in Figure 1, may be provided to correspond with the horizontal rows of factors which comprise the tables 5, 6, 7 and 8. 28 designates an index or pointer which is carried by the guide bar 26 or formed as a part of the knob or fingerpiece 25, the index being preferably extended towards the opposite sides of the slot 4 for cooperation with the graduations 27 and the table factors according to the angular adjustment of the arms or blades 10 and 11.

In the use of the instrument hereinbefore described, for the purpose of determining the amount of covering material required to cover a given roof, the user may take a position directly opposite one of the gables, in the case of a gabled roof, and by holding the gauge in a vertical position and sighting the edges 21 and 22 of the blades 10 and 11 against the slope of the roof lines and adjusting the knob or fingerpiece 25 upwardly or downwardly in the slot 4 until the edges 21 and 22 of the blades coincide with the slope of the roof lines, the index or pointer 28 will assume a position giving the various factors corresponding to the slope of the roof under consideration, as depicted in the tables 5, 6, 7 and 8. The adjustment may be checked by sighting the instrument against more than one gable, if there is more than one of the same slope embodied in the roof, as is often times the case, especially where there are one or more dormers. In adjusting the knob or fingerpiece 25 in the manner just described, the guide bar 23 will move upwardly or downwardly as the case may be, varying the angular relation of the blades 10 and 11. In Figure 1, the blades 10 and 11 are shown in full lines in an adjusted position corresponding to the full line position of the knob 25 and index 28, and are also shown in broken lines in another adjusted position corresponding to the broken line position of the knob 25 and index 28.

To insure the disposition of the instrument in a vertical position as the sights are taken, the instrument is preferably provided with some suitable form of level indicator, such as, for example, a plumb-bob 29 which is suspended by a cord 30 at one edge of the instrument. Spaced eyes 31 and 32 are mounted in the edge of the instrument, and the cord 30 is preferably extended through both eyes and knotted, as at 33, above the upper eye 31 to keep the cord from being withdrawn during the use of the plumb-bob. When the cord assumes a position in the center of the lower eye 32, it being understood that the eyes 31 and 32 are slightly larger than the cord 30, this indicates that the instrument is being held properly in a vertical position. Obviously, the plumb-bob may be easily detached from the instrument at will.

Now let it be assumed that in sighting the instrument and adjusting the same to the slope of the roof under consideration, as previously described, the index 28 assumes a position as indicated in full lines in Figure 1. Under this condition, the pitch of the roof is indicated in table 7 as a $$\frac{21}{24}$$

pitch. The actual area of the roof may then be readily determined by measuring the horizontal plan of the roof, calculating the horizontal area, and multiplying the horizontal area by the factor 2.0156 indicated in table 6.

In the case of a hip roof, or one which is partly hipped and partly gabled, the procedure is essentially the same, excepting that the slope of the roof is ascertained by taking a position so that the line of the slope of the roof will appear as a straight line and then holding the gauge so as to sight along the top edge 21 or 22 of one of the blades 10 or 11, making the necessary adjustment of the knob or fingerpiece 25 to bring the blade in line with the roof line. The pitch and corresponding factors will be indicated by the index 28 as in the case of a gable roof, and the actual surface area of the hip roof is computed in the same manner as previously explained. The use of the plumb-bob is more important in the case of hip roofs than gable roofs because in the former, the sighting of the instrument is primarily dependent upon the accuracy of alignment of the edge of only one of the adjustable blades, whereas, in the latter, both blades are aligned with the respective oppositely sloping lines of the roof.

To the roof areas computed as given above, must be added the usual waste items such as the hip and valley waste, under eaves course, etc. Ordinarily, one square foot per linear foot of hip or valley is sufficient waste to allow for wood or asphalt shingles, whereas two square feet per linear foot of hip or valley is generally allowed for rigid shingles such as slate, tile, asbestos, etc. To determine the hip and valley waste area, the hip and valley run, which may be readily computed from observation or from the building plans, is multiplied by the waste factor in table 8, corresponding to the slope of the roof which is now known. This factor, according to the example previously given, would be 2.2510.

All of the observations, calculations, and computations hereinbefore referred to may be carried out by the user of the instrument while remaining on the ground and without resort to the use of ladders and other bulky equipment. Moreover, the results attained by the use of my new instrument are far more accurate than those determined by the practices commonly employed heretofore.

Obviously, where building plans are available and give the slope of the roof either in terms of pitch or rise per foot of run, the roof coverage may be even more readily determined with the aid of my new instrument simply by setting the index 28 to correspond with the known pitch or rise per foot of run, thus eliminating the sighting operations. Other incidental uses of the instrument will be readily obvious to those familiar with the art of building construction.

While the specific details have been herein shown and described, the invention is not confined thereto, as changes and alterations may be made without departing from the spirit thereof as defined in the appended claims.

Having thus described my invention, what I claim as new and desire to secure by Letters Patent is:—

1. A device of the class described, comprising a frame having depicted thereon a table of roof factors, a pair of sighting blades hingedly interconnected together at one end and free to move relative to the frame at said interconnecting ends, and each blade pivotally and slidably connected with the frame for angular adjustment to accord with the slope of a roof, and indicator means operatively connected with the blades and cooperative with the table for indicating the factors corresponding to the sighting blade adjustments.

2. A device of the class described, comprising a substantially rectangular frame having a central longitudinal slot in one face thereof and having depicted on said face a table of roof factors at opposite sides of said slot, a pair of sighting blades hingedly connected together at one end and the respective blades being pivotally and slidably connected with the frame adjacent to the opposite corners thereof for angular adjustment to accord with the slope of a roof, a guide bar pivotally connected with the blades at their hinged connection and slidable in a groove extending longitudinally of said frame in alignment with and opposite to the slot aforesaid, means on said guide bar and disposed in said slot for sliding said guide bar whereby to adjust the angular position of said sighting blades, and said bar also having means coacting with the factor table at opposite sides of the slot for indicating the factors corresponding to the adjustments of the blades.

3. A device as claimed in claim 2, wherein the sighting blades are disposed in a space between the opposite faces of the frame, and the pivotal and slidable connection between the blades and the frame is established by pins projecting partially across said space and engaged in a groove provided in one face of each of the respective blades.

4. A device as claimed in claim 2, in combination with means for indicating the position of the frame with reference to a vertical plane, said last named means comprising a plumb-bob suspended at and affixed to one edge of the frame by a cord, and said frame having at its edge a restricted opening through which an intermediate portion of the cord is passed.

CLIFFORD O. MAGENHEIMER.